United States Patent [19]
Stumbo et al.

[11] Patent Number: 6,084,688
[45] Date of Patent: Jul. 4, 2000

[54] NETWORK PRINT SERVER WITH PAGE-PARALLEL DECOMPOSING

[75] Inventors: Nan M. Stumbo, Fairport; Mark R. Reinhart, Pittsford; Naveed Ismail; Chien-kuo E. Chuang, both of Rochester, all of N.Y.; Khanh P. Dinh, Anaheim, Calif.; Jim I. Benjamin, Fairport, N.Y.

[73] Assignee: Xerox Corporation, Stamford, Conn.

[21] Appl. No.: 09/070,062

[22] Filed: Apr. 30, 1998

[51] Int. Cl.[7] .................................................. G06K 15/00
[52] U.S. Cl. ......................................... 358/1.17; 358/1.16
[58] Field of Search ..................................... 358/1.1, 1.16, 358/1.17, 1.18, 1.14, 1.15, 404, 444

[56] References Cited

U.S. PATENT DOCUMENTS

| | | |
|---|---|---|
| 4,992,958 | 2/1991 | Kageyama et al. ...................... 364/519 |
| 5,075,874 | 12/1991 | Steeves et al. ........................... 395/112 |
| 5,170,340 | 12/1992 | Prokop et al. ........................... 364/143 |
| 5,226,112 | 7/1993 | Mensing et al. ......................... 395/114 |
| 5,327,526 | 7/1994 | Nomura et al. ......................... 395/115 |
| 5,371,837 | 12/1994 | Kimber et al. ........................... 395/114 |
| 5,715,379 | 2/1998 | Pavlovic et al. ......................... 395/112 |

*Primary Examiner*—Arthur G. Evans
*Attorney, Agent, or Firm*—R. Hutter

[57] ABSTRACT

A network printing system is available to a large population of users submitting jobs thereto at random times. The system includes a first decomposer facility, such as for PostScript™ or PDF interpretation, and a second decomposer facility, such as for PCL interpretation. The first decomposer facility is capable of parallel interpretation of multiple page images within a job, while the second decomposer facility may not be. A buffer manager arbitrates the operation of the decomposer facilities, so that page images of different page description languages or other image formats are processed optimally.

15 Claims, 3 Drawing Sheets

NETWORK PRINT SERVER WITH PAGE-PARALLEL DECOMPOSING

INCORPORATION BY REFERENCE

The present application incorporates by reference U.S. Pat. No. 5,715,379, for "Architecture for a Digital Printer With Multiple Independent Decomposers," assigned to the assignee hereof.

FIELD OF THE INVENTION

The present invention relates to a method for the decomposition and transfer of large quantities of digital data in the context of high-speed digital printing, such as with a high-volume "laser printer."

BACKGROUND OF THE INVENTION

High-speed digital printing presents unique requirements to data-processing equipment. For example, to operate a printing apparatus which is designed to output over 100 page-size images per minute, the ability to make the desired image data to print a particular page available to the printing hardware requires very close tolerances in the management of the "overhead" when data is transferred from a memory and applied to the printing hardware. A typical letter-sized page image at 600 spi resolution, in a format suitable to be submitted to printing hardware, is typically of a size of about 4MB; when printing hardware demands the image data to print the particular page image, this 4 MB image data must be accessed from memory within a time frame of approximately 300 milliseconds.

As is known in the art of digital printing, these large quantities of data must be processed in numerous sophisticated ways. For example, image data in a page description language (PDL), such as HP-PCL or PostScript™, must be decomposed into raw digital data, and this raw digital data may often have to be compressed and decompressed at least once before the data reaches the printing hardware. In addition, in a high-volume situation where hundreds of different pages are being printed in various jobs, the particular set of image data corresponding to a page to be printed at a given time-window must be carefully managed.

Adobe® Corporation, creator of the "PostScript™" page description language, has developed a system, generally known by the trademark "Extreme™," which enables what can be called "page-parallel" decomposition of page images to be sent to printing apparatus. In brief, the "Extreme" concept involves taking a multi-page job, which may be originally in the PostScript PDL, and as a first step converting the PostScript image into a "portable document format" file or PDF. The advantage of the portable document format file is that it is page-independent: a multi-page document converted into a PDF can readily be divided into subsets of data, each subset of data corresponding to one of the multiple page images in the job or document. The Extreme architecture exploits the page-independence of PDF by being able to divide the data for a multi-page document readily into component subsets, each subset corresponding to one page of the document, and sending a plurality of such page images to multiple decomposers simultaneously. In this way, a number of individual page images in a multi-page document can be decomposed in parallel, thus sharply reducing the amount of time required to decompose an entire multi-page document.

The network printing system marketed by Xerox Corporation under the trademark DocuSP™, or "Document Services Platform," the basic functionality of which is described in detail in the patent incorporated by reference above, is a system which allows a relatively large population of users on a network to submit jobs at random times to a high-speed (such as 180 ppm) printing apparatus. In brief, DocuSP uses a plurality of independent decomposers, which may be for different PDL's, such as PostScript or PCL, and directs jobs coming in over the network to the appropriate decomposer. DocuSP uses what is called a "buffer manager" to keep track of individual page images as they emerge at random times from different decomposers. Then, decomposed images from various users can be retained in memory until the precise time-window in which a particular page image for a particular job is output by the high-speed digital printing apparatus.

The present invention is basically an arrangement by which the page-parallel decomposing of Adobe Extreme system can be integrated with the high-speed, multi-user model of DocuSP.

DESCRIPTION OF THE PRIOR ART

In the prior art, U.S. Pat. No. 5,075,874 discloses a printer having a plurality of physical ports which accept hardware cables. Each port is dedicated to a particular PDL emulation, although it is possible to temporarily reconfigure a particular port to accept a different PDL.

U.S. Pat. No. 5,170,340 discloses an electronic reprographic system having a plurality of hardware and software system components, which a control system construes as various virtual machines. There is included in the system a scheduler for managing resources and setting priorities for various virtual machines defined by the system to process job requests in an efficient manner. The scheduler causes memory from a first virtual machine in the system to be distributed to a second virtual machine in the system when the second virtual machine requests more memory than is normally allocated to it.

U.S. Pat. No. 5,226,112 discloses a system by which original data in different PDL's can be processed by the same processor. When the processor is requested to decompose data of a particular PDL, the processor retrieves suitable translation instructions for the particular PDL, in order to interpret the data. When a second set of image data, of a different PDL than the first image data, is submitted to the processor, the processor retrieves another interpretation code for interpreting the second set of data.

U.S. Pat. No. 5,327,526 discloses a print job control system which processes print requests to set an order of priority for printing print jobs. A print job manager checks the print request and determines which print option is selected and manipulates the queue identifier associated with print jobs and enters them into a print queue table.

U.S. Pat. No. 5,371,837 discloses a virtual printer system in which a user on a network is allowed to select a printer default configuration from a plurality of preset default configurations to control a printer on the network. By this technique, print data for a plurality of printer configurations can be sent through a single printer network interface to a single printer.

U.S. Pat. No. 5,715,379, incorporated by reference above, describes a digital printing system wherein a plurality of decomposers operate simultaneously and independently.

The Xerox® "DocuTech"® network printing system includes provision for combining multiple files together as a single print job, even if the different files are of different PDL file types or TIFF image files. Separate files can be submitted to the network server, and then submitted by the network server to printer hardware as a single output document.

SUMMARY OF THE INVENTION

According to one aspect of the present invention, there is provided a method of operating a digital printing system including a first decomposer facility, the first decomposer facility including a plurality of decomposers, each decomposer being adapted to independently decompose a page image submitted thereto, and a second decomposer facility. A memory retains decomposed image data from the first decomposer facility and the second decomposer facility, the memory comprising a plurality of buffers, each buffer being a space for retaining image data corresponding to one decomposed page image. When a first decomposer in the first decomposer facility outputs a first page image, a first buffer is accessed in the memory to accept the page image. When a second decomposer in the first decomposer facility outputs a second page image, a second buffer in the memory is accessed to accept the second page image before the first decomposer finishes outputting the first page image.

According to another aspect of the present invention, there is provided a method of operating a digital printing system including a first decomposer facility, the first decomposer facility including a plurality of decomposers, each decomposer being adapted to independently decompose a page image submitted thereto. A memory retains decomposed image data, the memory comprising a plurality of buffers, each buffer being a space for retaining image data corresponding to one decomposed page image. When a decomposer in the first decomposer facility outputs a page image, a buffer is accessed in the memory to accept the page image. The number of buffers in the memory which can be accessed at one time is no more than a predetermined number.

DETAILED DESCRIPTION OF THE INVENTION

Figure 1:
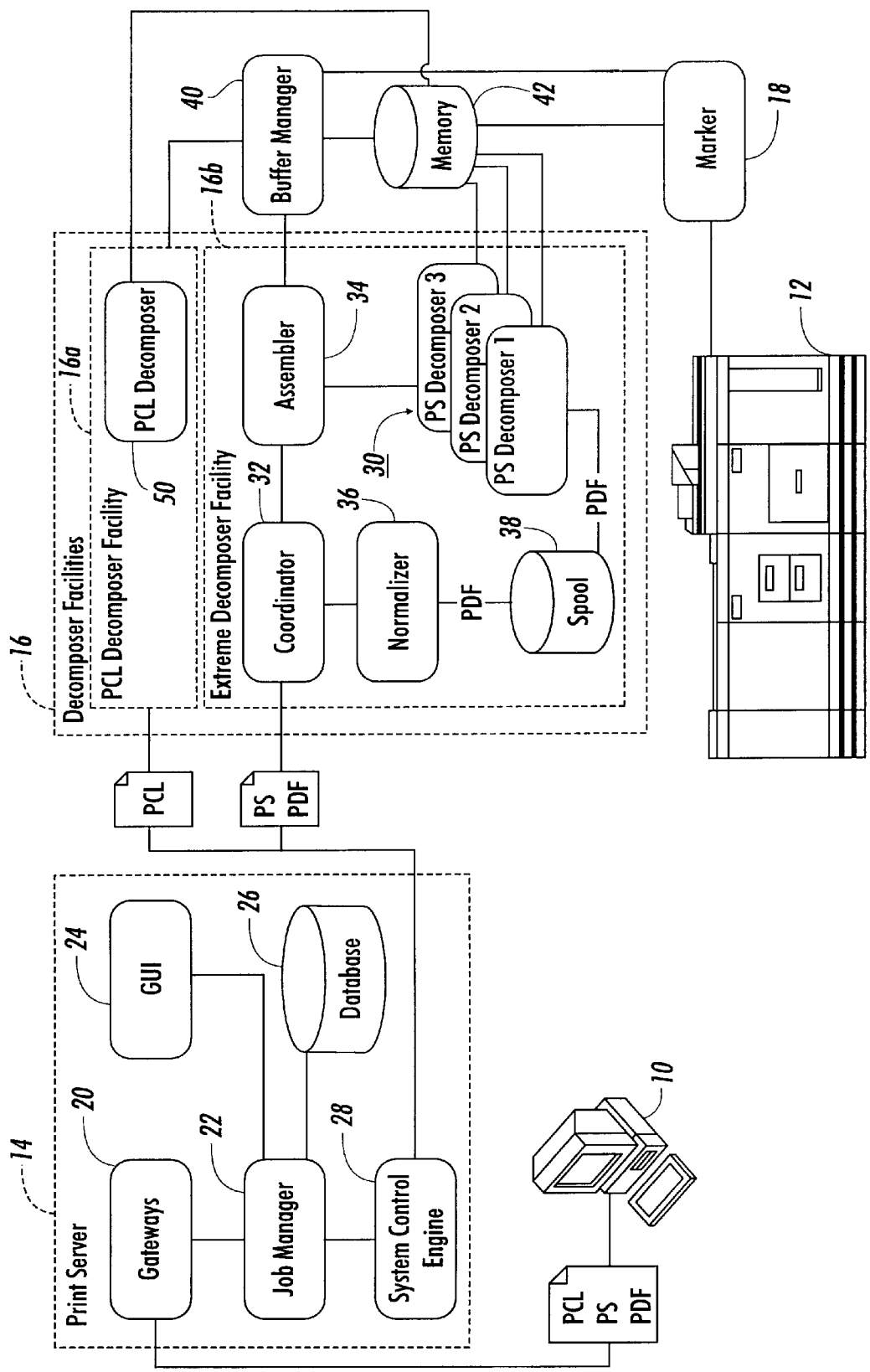
FIG. 1 is a systems diagram of one embodiment of the present invention.

FIG. 1 is a high-level systems view of a network printing apparatus incorporating the present invention. While the below description of a preferred embodiment will be concentrating on integrating two commercially-available products, Adobe Extreme and Xerox DocuSP, it will be appreciated that the claimed invention shall not be limited to such a specific implementation.

Jobs comprising image data to be printed are submitted from a job submission client 10, which of course could be any of a large number of computers on a network (not shown). The jobs from the clients 10 are ultimately intended to be printed out on a high-speed digital printing apparatus such as 12. Interposed between the client 10 and the printing apparatus 12 is a print server indicated as 14, one or more decomposer facilities generally indicated as 16 (here divided into a first decomposer facility 1 6a and a second decomposer facility 16b), a buffer manager 40 and what is here called a marker 18. In the preferred embodiment of the present invention, the print server 14 includes all of the elements of the commercially-available DocuSP. One instance of the decomposer facility 16a in this embodiment is a commercially-available PCL decomposer facility. The other decomposer facility 16b in this embodiment includes the commercially available elements of Adobe Extreme. Buffer manager 40 is responsible for collecting the image data from each of the decomposer facilities, and holding them until marker 18 is ready for them. Marker 18 is intended to represent the software, which is directly operative of the printing hardware, which outputs sheets.

Turning first to print server 14, jobs submitted from client 10 pass through a gateway 20, which interacts with a job manager 22. The job manager 22 is the interface of the print server to the user, and would typically be apparent to the user through a pop-up screen on the client's computer, as indicated by graphical user interface (GUI) 24. The job manager 22 also interfaces with a database 26 which includes software that would, for example, enable the client to select, for example stapling, plex, output and stock options. The job manager 22 further interfaces with a system control engine 28, which directs each job to the appropriate decomposer facility 16, and directly interfaces with marker 18 to exercise some control over the hardware in printing apparatus 12, such as staplers, output trays and feeders.

The decomposer facilities 1 6 are responsible for taking image data in a PDL and generating the decomposed image data to be printed on the printing apparatus 12. Decomposer facility 16a has at its core a PCL decomposer 50, which is responsible for interpreting PCL documents. The decomposer facility 1 6b embodies the Adobe Extreme system, which includes at its "heart" a plurality of independently-operating decomposers generally indicated as 30, and specifically divided into independent decomposers 30a, 30b, 30c. In the Adobe Extreme environment as currently available at the time of filing of the present invention, each of the decomposers 30a, 30b, 30c is a PostScript decomposer. (For purposes of the claims, the PCL and PostScript PDLs shown in the present embodiment can be generalized into first and second "image formats," such image formats including not only PDL's but also other image and information formats such as, but not limited to, TIFF, ASCII, PDF, and facsimile formats.)

To enable the parallel processing of page images from the decomposers 30a, 30b, 30c, Adobe Extreme includes three essential services, a coordinator 32, an assembler 34, and a normalizer 36. The function of coordinator 32 is to take the image data from a PostScript job ultimately submitted from client 10 from system control engine 28 and direct it through the various Extreme services. These services will ultimately divide the data for the multi-page document into component subsets of data, each subset of data corresponding to one page to be printed. In order to perform this division, any job submitted in PostScript (or conceivably another PDL, such as PCL) must be first converted to PDF ("portable document format," such as available under the trademark "Adobe® Acrobat™"), which is structured to allow page independence. If the image data submitted to coordinator 32 is submitted in PostScript or other language, the normalizer 36 converts this original image data to PDF. This converted PDF document is stored on the spool 38. The coordinator then submits the PDF document to the assembler 34, which in turn submits individual page images to decomposers 30a, 30b, 30c as each becomes available to accept subsets of page data.

As decomposers 30a–30c are PostScript decomposers, it will be evident that, in this particular implementation, image data which was first converted from PostScript to PDF for dividing into page images must be reconverted into PostScript so that it can be decomposed by one of the decomposers 30a–30c. When decomposers 30a–30c complete the generation of the decomposed image data, they pass them back to assembler 34. Assembler 34 re-assembles the page images in a particular job so that the decomposed data from decomposers 30a–30c can be output to marker 18 in the necessary order so that the pages of the final printed document are in order. To be able to re-assemble the page images, the assembler 34 keeps track of pages that are completed before they are ready to be output. Assembler 34 then passes the re-ordered image data on to be printed on print apparatus 12.

Whereas the Extreme decomposer facility 16b, as currently commercially available, is suitable for high-speed decomposition of individual multi-page documents and jobs, another "dimension" of functionality is required in a situation in which multiple jobs, from multiple clients, are intended to be decomposed simultaneously. The overall function of the DocuSP product is to handle situations in which a large number of users may submit multi-page jobs to the system at random times, essentially simultaneously.

In order to provide the "page parallel" capability of the Extreme decomposer facility 16b in a highly networked, multi-user environment, the present invention provides a data queuing method, the functionality of which is carried out by what is here called a buffer manager 40. Buffer manager 40 interacts with the decomposer facility 16 and a memory indicated as 42. As is familiar in the art of network printing, it is typically necessary to provide such a memory 42 to temporarily retain decomposed page image data emerging from one of the decomposers, until such time as the data for the particular page image is required by marker 18 for immediate submission to printing hardware 12.

Figure 2:
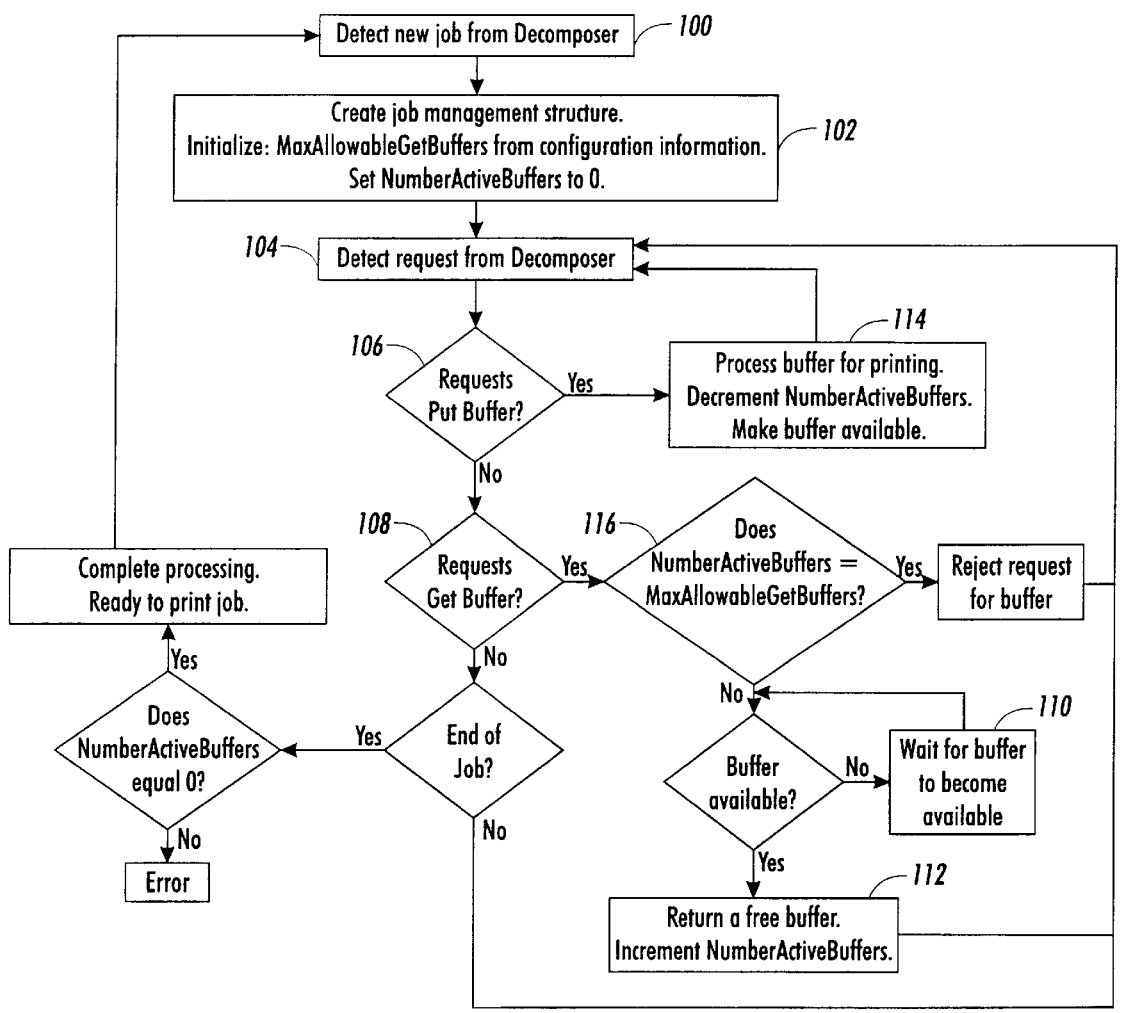
FIG. 2 is a flowchart showing the operation of a "buffer manager" in conjunction with the present invention.

FIG. 2 is a flowchart illustrating the operation of buffer manager 40 according to a preferred embodiment of the present invention. In the present invention, the buffer manager 40 has two purposes: to exploit the page-parallel processing capabilities of Extreme to minimize the total processing time of a multi-page document, and to balance demands across multiple decomposer facilities such as 16a and 16b.

An important direct function of buffer manager 40 is to set aside buffers for page images of decomposed data which emerge at essentially random times from decomposer facilities 16a, 16b. In order to match the essentially random production of sets of decomposed image data from the decomposer facilities 16a, 16b to the demands of marker 18 for page image data in a specific order and relatively evenly distributed over time, the buffer manager 40 accepts page images of decomposed data from decomposer facilities 16a, 16b and places these individual page images in specific locations within memory 42. Eventually, the sets of decomposed image data corresponding to individual pages are read out from these specific locations in buffer 42 to marker 18 (although, as is known in the art, the decomposed data corresponding to page images in buffer 42 may be to some extent compressed, such data would still be essentially directly operative of the imaging hardware in printing apparatus 12).

In order to set aside and keep track of distinct locations within memory 42 (which shall be known in the following description as "buffers," with the understanding that, generally, a set of data for one decomposed page image corresponds to one "buffer"), the buffer manager 40 can accept from the decomposer facility 16 two essential commands: "GetBuffer" and "PutBuffer." "GetBuffer" is a command by which the decomposer facility 16 requests the buffer manager 40 to set aside one buffer within the memory 42, into which buffer the corresponding decomposer will write the decomposed data corresponding to one page image. A document or job having N pages associated therewith will of course ultimately require N buffers. "PutBuffer" is a command from the decomposer facility, made after a particular set of decomposed page image data is written into a buffer, stating that the freshly-written page image data is ready to be sent on to the marker 18. The PutBuffer command, in a preferred embodiment of the present invention, may also indirectly invoke information useful to the marker 18 with regard to the page image, such as indicating what type of sheet the images is to be placed on, whether the decomposed page image data is compressed in any way, and also how the particular page image fits into a larger job or document (i.e., what page in a multi-page document the page image is).

With reference to the flowchart of FIG. 2, it can be seen how the buffer manager 40 handles GetBuffer and PutBuffer commands to reach its objectives. At step 100, the buffer manager 40 detects a new job from the decomposer facility 16. As is known in the art, a "job" will have associated therewith one or more page images, either arranged as a single document or as multiple documents (i.e., it is commanded to output several copies of the same document). When the new job is requested, as shown at step 102, the buffer manager 40 begins an initialization step in which the number of active buffers, that is number of buffers the decomposer facility 16 for this job currently has accesses to at one time is set to 0. Simultaneously, the buffer manager 40 retains a maximum number of allowable GetBuffers it can accept at one time from a decomposer facility such as 16a or 16b. For reasons which will be explained in detail below, the buffer manager 40 is given a pre-set limit to how many buffers it can access in the memory at any time.

With every new job, there will be produced, at essentially random times, a series of GetBuffer and PutBuffer requests from decomposer facility 1 6, each individual page image in the job having its own GetBuffer and PutBuffer command associated therewith. Once again, when the decomposer facility issues a GetBuffer command, it is requesting the buffer manger 40 to set aside a buffer within memory 42, and a PutBuffer command indicates to the buffer manager 40 that the particular page image is ready to be sent to the marker 18. Significantly, the PutBuffer commands must be issued in an order corresponding to the page image order in the document desired to be printed, so that the printing apparatus 12 will output a finished printed document having the page images therein in the correct order. In the prior-art DocuSP system, a GetBuffer for a particular page cannot be accepted until after a PutBuffer command for the previous page. However, in the present invention, the GetBuffer commands need not be in page image order, and to some extent a number of GetBuffer commands can be handled before a PutBuffer is required.

Thus, with reference to decision trees 106 and 108 and their following instructions, the buffer manager 40 waits for either a PutBuffer or GetBuffer command. In will be noticed, in FIG. 2, that for every GetBuffer command (decision 108), the page image associated with the GetBuffer command must wait until a buffer is available in memory 42 before the decomposer can start sending data to the memory 42 (step 110). Once a buffer becomes available in memory 42 to accept the decomposed data corresponding to the page image, not only is the buffer made available, the number of active buffers, which is monitored by buffer manager 40, is incremented (step 112). Conversely, when buffer manager 40 receives a particular PutBuffer command (decision 106) the page image data which has been written into the buffer is made available for printing, the buffer is made available, and the number of active buffers is decremented (step 114). In short, buffer manager 40 maintains a constant count of how many buffers are being accessed at any given time for one job. The buffer manager 40 does not make another buffer available to a particular decomposer facility, if the number of active buffers equals the preset maximum allowable number of GetBuffers (decision 116). When an "end of job" is received from decomposer facility 16, the number of page images using active buffers must be 0, and the job ends. If the number of active buffers is not 0, then an error has occurred and must be handled appropriately.

It should be noted, with regard to the flowchart in FIG. 2, that the flowchart in FIG. 2 is replicated for each of the decomposer facilities 16 being operated. Thus, the PCL decomposer facility 16a may be making GetBuffer and PutBuffer requests at the same time the Extreme decomposer facility 16b is making such requests. The PCL decomposer facility 16a, having only one PCL decomposer, would be making a GetBuffer request, generating the decomposed image data and then making a PutBuffer request. Meanwhile, the Extreme decomposer facility 16b having multiple independent PostScript decomposers, would be making multiple GetBuffer requests, to provide a buffer for each of its decomposers. Each of the PostScript decomposers 30 would then generate the decomposed image data for the page it is assigned, and store it in the corresponding buffer. Finally the Extreme decomposer facility 16b would make the PutBuffer requests as the decomposed image data are available in printing order.

Figure 3:
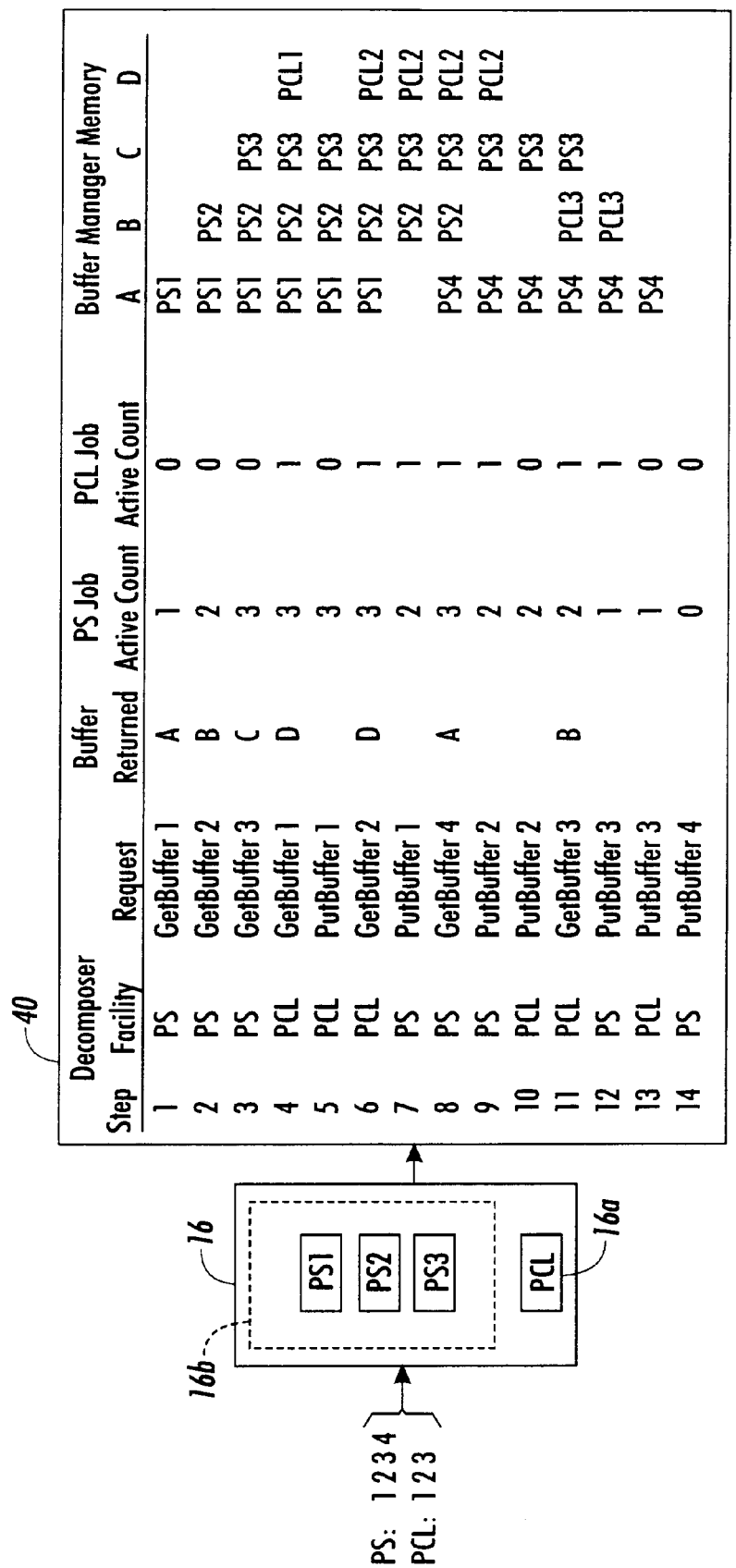
FIG. 3 is a diagram showing the interaction between two decomposer facilities, buffer manager, and common image pool, to carry out the method of the present invention.

FIG. 3 is a diagram illustrating the operation of a buffer manager according to the present invention in decomposing two independent jobs, one a PostScript job and the other a PCL job, essentially simultaneously. As shown in FIG. 3, there is provided within the decomposer facility 16, a PCL decomposer facility 16a, and an Extreme decomposer facility 16b. The PCL decomposer facility 16a has a single PCL decomposer. The Extreme decomposer facility 16b has three independent PostScript decomposers, PostScript1, PostScript2, PostScript3, arranged for page-parallel processing within the Adobe Extreme functionality. It should be noted that the PCL decomposer facility 16a and the Extreme decomposer facility 16b must compete for the same pool of available buffers. This competition for buffers, which will have a direct effect on the timing and order of the output of jobs from printing apparatus 12, is in effect arbitrated by buffer manager 40.

The number of maximum allowable GetBuffers (i.e., number of buffers that a single decomposer facility may access at one time for a given job), which is associated with the buffer manager 40, can be varied depending on the number of decomposers which could possibly be utilized in a particular situation, and is also affected by the amount of memory accessible to the buffer manager 40, and by the page sizes that will be supported in a particular job (for example, if posters are being printed, the necessarily large size of single page images may restrict the number of buffers which may be accessed simultaneously for proper operation of the system). In this particular embodiment, the buffer manager has enough memory for four buffers, each of which is large enough to hold the data associated with one page of either the PostScript or the PCL job. The predetermined maximum number of GetBuffers at any one time is three. Of course both of these numbers can vary depending on a particular implementation. In a preferred embodiment of the present invention, the maximum number of GetBuffers is typically set greater than or equal to the number of independent, parallel decomposers within a page-parallel decomposer facility, such as the three decomposers in decomposer facility 16b. (It should be noted, with regard to the claims, that limiting the number of buffers to a predetermined number available at one time is more complicated than merely providing a memory of a limited size: the number of "allowed" buffers is the relevant parameter to optimizing the operation of the system, not the mere size of the memory, even though a small memory may coincidentally limit the number of buffers of a certain page size.)

With reference to the representation of the decomposers 30, each individual PostScript decomposer PostScript1, PostScript2, and PostScript3 within the Extreme functionality will be able to take one particular page image and decompose it essentially independently of the decomposition of other page images within the same job. In this example, two jobs will be processed roughly simultaneously, a PostScript job with four pages, and a PCL job with three pages.

There is shown in FIG. 3, with reference to buffer manager 40, a sequence of GetBuffer and PutBuffer commands that the buffer manager 40 would receive as decomposed image data becomes available from one or the other decomposer facility 16 in this example. PutBuffer commands must be made in the order in which the pages are desired to be printed by printing apparatus 12. Also, once buffer manager 40 has allocated all four of its buffers to GetBuffer requests, it can not satisfy a new GetBuffer until a buffer becomes available via a PutBuffer request (this corresponds to step 110 in FIG. 2).

With reference to the particular example shown in FIG. 3, if the PostScript job enters a system first, the Extreme decomposer facility 16b will make three GetBuffer requests to get a buffer for each of its decomposers to work on a page (Steps 1–3). The buffer manager 40, having no previously assigned buffers, will simply return the first three available buffers, herecalled A, B, and C (although there may be in fact a large number of possible buffers in the sense of addresses within memory 42 to which page image data may go, the letters A, B, C here represent available "slots" among the maximum four buffers managed by the buffer manager 40 in this example). In the column of the chart labeled "PostScript Job Active Buffer Count" associated with buffer manager 40 in FIG. 3, there is shown an ongoing list of the number of active buffers in use at any time by the Extreme decomposer facility 16b. As can be seen, whenever there is a GetBuffer command the number of active buffers increases, and whenever there is a PutBuffer command the number of active buffers decreases.

When the PCL job comes in, the PCL decomposer facility 16a makes a GetBuffer request (Step 4 of FIG. 3). Buffer manager 40 returns the next available buffer, here called D. As with the PostScript job, there is also a count of active buffers maintained for the PCL decomposer facility, as shown in the column labeled "PCL Job Active Buffer Count", in FIG. 3. At this point, after Step 4, all of the buffer manager's 40 buffers have been allocated. If Step 5 happened to be another GetBuffer request, say from a third decomposer facility in the system, the buffer manager could not return a buffer until one became available via a PutBuffer request from either the PCL or Extreme decomposer facility 16 (this corresponds to step 110 in FIG. 2).

As the PCL and PostScript decomposers complete the generation of the decomposed image data for the page they are working on, the corresponding decomposer facility, will make a PutBuffer request. The GetBuffer and PutBuffer requests continue until both the PostScript and PCL jobs are completed.

An important feature facilitated by the present invention, in particular as an advantage over the system in the patent application referenced above, is that, as can be seen in the list of commands associated with buffer manager 40, the buffer manager can accept multiple GetBuffer requests and thereby allow a single decomposer facility access to multiple buffers simultaneously, without an immediately following PutBuffer command. With the system commercially known as "DocuSP," the buffer manager can permit a decomposer facility 16 to write the decomposed data to the buffer only one page image at a time. The system of the present invention exploits the page-parallel properties of the Extreme architecture and, as shown in FIG. 3, permits multiple GetBuffer commands to be addressed simultaneously.

The buffer manager of the present invention sets forth a predetermined maximum number of allowable GetBuffers that may be accepted from one decomposer facility 16 at one time to prevent one decomposer facility such as 16b from locking out other decomposer facilities such as 16a. Consider the situation in FIG. 3 where the buffer manager 40 has enough memory for four buffers; suppose that the first page of the PostScript job, for reasons of its image complexity, takes a particularly long amount of time to process, and the second page of the PostScript jobs takes a very small amount of time to process; and finally suppose that the PCL job enters the system after the second page of the PostScript job is done processing. When the Extreme decomposer facility 16b receives the PostScript job, it would make three GetBuffer requests, as in FIG. 3. For each of the first three pages, the assembler 34 will direct each of its PostScript decomposers 30 to process a page, i.e. PostScript1 (PS1) gets page 1, PostScript2 (PS2) gets page 2 and PostScript3 (PS3) gets page 3. When PostScript2 finishes page 2, the decomposer facility can not make the PutBuffer request, because page 2 is not the first page to be printed. Thus the assembler 34 keeps track of this page until page 1 has completed. The decomposer facility 16b wants to keep all of its decomposers busy and thus would make a GetBuffer request for page 4. If the buffer manager 40 did not have a predetermined maximum number of allowable GetBuffers, it would be able to return its fourth and final buffer. If the PCL decomposer facility 16a were to make a GetBuffer request at this time, it would have to wait until a buffer became available, i.e. when decomposer PostScript1 completes the interpretation of page 1 and the Extreme decomposer facility 16b makes the PutBuffer request for page 1. This puts the PCL decomposer facility 16a at a disadvantage since it can only work on one page at a time, while the Extreme decomposer facility 16b is capable of working on multiple pages.

According to a preferred embodiment of the present invention, any decomposer facility 16a, 16b can access any of the buffers managed by the buffer manager 40, but at any one point in time, a decomposer facility can access a predetermined number of buffers less than or equal to the number of buffers managed by the buffer manager 40. With a page-parallel decomposer facility such as 16b, it does not make sense to set the limit on the number of buffers to be a number less than the number of parallel decomposers 30 in the decomposer facility. In the FIG. 3 example there are four buffers managed by the buffer manager 40, and the maximum number of buffers is set to three. This allows decomposer facility 16b to keep all of its PS decomposers busy, but still allows the PCL decomposer in 16a a chance to get a buffer as quickly as possible (i.e. it doesn't have to wait around for an available buffer). Had this number been set to four, this would have allowed a system to maximize the throughput of the page-parallel decomposer facility 16b, at the expense of the other facility 16a; but this might make sense in some situations, such as if a given system expects 95% or more of its input to be suitable to page-parallel decomposition.

In another case, where the page-parallel decomposer facility 16b still has three PS decomposers, but the buffer manager has a total of ten buffers, one might want to set the maximum number of buffers that can be accessed at one time by the page-parallel decomposer facility 16b in the range of 6–8 depending on how many other decomposer facilities are in the system, and what percentage of the jobs the other decomposer facilities are expected to handle.

The predetermined number of allowable GetBuffers, according to the present invention, prevents one job from holding all of the buffer manager's 40 resources and allows all jobs submitted to the system to be printed as quickly as possible.

While the invention has been described with reference to the structure disclosed, it is not confined to the details set forth, but is intended to cover such modifications or changes as may come within the scope of the following claims.

What is claimed is:

1. A method of operating a digital printing system, comprising the steps of:

providing a first decomposer facility, the first decomposer facility including a plurality of decomposers, each decomposer being adapted to independently decompose a page image submitted thereto, and a second decomposer facility including at least one decomposer;

providing a memory to retain decomposed image data from the first decomposer facility and the second decomposer facility, the memory comprising a plurality of buffers, each buffer being a space for retaining image data corresponding to one decomposed page image;

when a first decomposer in the first decomposer facility outputs a first page image, accessing a first buffer in the memory to accept the page image;

when a second decomposer in the first decomposer facility outputs a second page image, accessing a second buffer in the memory to accept the second page image before the first decomposer finishes outputting the first page image.

2. The method of claim 1, the first page image and the second page image being parts of a same job.

3. The method of claim 1, the second decomposer facility being not capable of accessing a second buffer in the memory to accept a second page image before finishing outputting a first page image after accessing a first buffer in the memory to accept the first page image.

4. The method of claim 1, a number of buffers in the memory which can be accessed by the first decomposer facility or the second decomposer facility at one time being no more than a predetermined number.

5. The method of claim 4, the number of buffers in the memory which can be accessed at one time by the first decomposer facility or the second decomposer facility being greater than the number of decomposers in the first decomposer facility.

6. The method of claim 1, the number of buffers in the memory which can be accessed by the first decomposer facility at one time being equal to the number of decomposers in the first decomposer facility.

7. The method of claim 1, the first decomposer facility adapted to process image data according to a first image format and the second decomposer facility adapted to process image data according to a second image format.

8. The method of claim 7, the first image format being different from the second image format.

9. A method of operating a digital printing system including a first decomposer facility, the first decomposer facility including a plurality of decomposers, each decomposer being adapted to independently decompose a page image submitted thereto, comprising the steps of:

providing a memory to retain decomposed image data, the memory comprising a plurality of buffers, each buffer being a space for retaining image data corresponding to one decomposed page image; and when a decomposer in the first decomposer facility outputs a page image, accessing a buffer in the memory to accept the page image;

a number of buffers in the memory which can be accessed by the first decomposer facility at one time being no more than a predetermined number.

10. The method of claim 9, the digital printing system further including a second decomposer facility including at least one decomposer.

11. The method of claim 10, the first decomposer facility being adapted to process image data according to a first image format and the second decomposer facility adapted to process image data according to a second image format different from the first image format.

12. The method of claim 10, the first decomposer facility being capable of accessing a first buffer in the memory to accept a first page image, and accessing a second buffer in the memory to accept a second page image before the first decomposer facility finishes outputting the first page image.

13. The method of claim 12, the second decomposer facility being not capable of accessing a second buffer in the memory to accept a second page image before finishing outputting a first page image after accessing a first buffer in the memory to accept the first page image.

14. The method of claim 10, the number of buffers in the memory which can be accessed at one time by the first decomposer facility or the second decomposer facility being greater than the number of decomposers in the first decomposer facility.

15. The method of claim 14, the number of buffers in the memory which can be accessed by the first decomposer facility at one time being equal to the number of decomposers in the first decomposer facility.

* * * * *